(12) United States Patent
Putkonen (10) Patent No.: US 8,364,440 B2
(45) Date of Patent: Jan. 29, 2013

(54) SYSTEM FOR EVALUATING THE PRODUCTIVITY OF A WORKING MACHINE AND ITS DRIVER

(75) Inventor: Aki Putkonen, Tampere (FI)

(73) Assignee: John Deere Forestry Oy, Tampere (FI)

( * ) Notice: Subject to any disclaimer, the term of this patent is extended or adjusted under 35 U.S.C. 154(b) by 213 days.

(21) Appl. No.: 12/472,816

(22) Filed: May 27, 2009

(65) Prior Publication Data

US 2009/0299707 A1 Dec. 3, 2009

(30) Foreign Application Priority Data

May 27, 2008 (FI) ...................................... 20085501

(51) Int. Cl.
- *G06F 11/30* (2006.01)
- *G06F 17/18* (2006.01)
- *G01B 5/00* (2006.01)

(52) U.S. Cl. ........................... 702/182; 702/33; 702/179
(58) Field of Classification Search .................. 702/182, 702/33, 179
See application file for complete search history.

(56) References Cited

U.S. PATENT DOCUMENTS

| | | | |
|---|---|---|---|
| 4,035,621 A | 7/1977 | Kemp | |
| 5,650,928 A | 7/1997 | Hagenbuch | |
| 5,815,826 A | 9/1998 | Henderson et al. | |
| 5,865,229 A * | 2/1999 | Unosen | 144/4.1 |
| 5,865,299 A * | 2/1999 | Williams | 198/811 |
| 6,144,910 A * | 11/2000 | Scarlett et al. | 701/50 |
| 6,917,846 B1 | 7/2005 | Muller | |
| 2002/0091473 A1 | 7/2002 | Gardner et al. | |
| 2003/0083796 A1 | 5/2003 | Denton | |
| 2004/0250908 A1 * | 12/2004 | Hicks | 144/335 |
| 2010/0065155 A1 | 3/2010 | Peltomae et al. | |

FOREIGN PATENT DOCUMENTS

| | | |
|---|---|---|
| FI | 20055266 | 12/2006 |
| JP | 10283518 | 10/1998 |
| RU | 2260851 C2 | 9/2005 |
| WO | 0221480 A1 | 3/2002 |
| WO | WO 0221480 A1 * | 3/2002 |
| WO | 2006128786 A1 | 12/2006 |
| WO | WO 2006128786 A1 * | 12/2006 |

OTHER PUBLICATIONS

Jang, Anfis : Adaptive-Network-Based Fuzzy Inference System, May/Jun. 1993, IEEE Transactions on Systems, Man, and Cybernetics, vol. 23, pp. 665-684.*
Palmroth et al. Work Cycle recognition in human operated machines using Hidden Markov Models. The 8th International Conference on Motion and Vibration Control (MOVIC 2006), Aug. 27-30, 2006, pp. 459-464.

(Continued)

*Primary Examiner* — Michael Nghiem
*Assistant Examiner* — Ricky Ngon (57) ABSTRACT

A system and method for evaluating the productivity of a working machine and its driver in a real or virtual operating environment is controlled by a control system to perform work, and in which the work cycles relating to the work performed by the working machine are determined by continuous measurements directed to the working machine when it is controlled by the driver. Characteristic values relating to the performance of the determined work cycles are collected on the basis of the continuous measurements for the purpose of evaluating the performance of the work or for comparison.

20 Claims, 5 Drawing Sheets

OTHER PUBLICATIONS

Kurahashi et al. Extracting Technology and Detecting Outliers from Process Time Series Data Reflecting Expert Operator Skills. SICE-ICASE International Joint Conference 2006, Oct. 18-21, 2006, 6 pages.

Simulators to Learn to Work Faster, 2007, 2 pages, English translation attached, Retrieved from the internet:< http://web.archive.org/web/20070922203200/http://www.deere.com/fi_FI/equipment/forestry/virtual/index.html>.

Tervo et al. Improving Operator Skills with Productivity Model Feedback. Proceedings of the 17th World Congress, The International Federation of Automatic Control, Jul. 6-11, 2008, pp. 15724-15729.

Suzuki et al. Assist Control and its Tuning Method for Haptic System, 2006, pp. 374-379.

Zhang et al. Intelligent Control Rule for Tractor with Continuously Variable Transmission. Proceedings of the 2006 IEEE, International Conference on Mechatronics and Automation, Jun. 25-28, 2006, pp. 1712-1716.

Office Action from Finnish Patent Office in counterpart Finnish Application No. 20085501 (6 pages)(Apr. 27, 2011).

Office Action from Swedish Patent Office in counterpart Swedish Application No. 0900666-9 (4 pages)(Feb. 15, 2010).

Office Action from Russian Patent Office in counterpart Russian Application No. 2009120025, with English Translation (8 pages)(Sep. 16, 2011).

Background Information (4 pages)(Admitted Prior Art).

Decision on Grant from Russian Patent Office in counterpart Russian Application No. 2009120025/08(027598), with English Translation (15 pages)(Feb. 7, 2012).

* cited by examiner

SYSTEM FOR EVALUATING THE PRODUCTIVITY OF A WORKING MACHINE AND ITS DRIVER

CROSS-REFERENCE TO RELATED APPLICATIONS

This application claims the benefit of Finnish Application No. 20085501, filed May 27, 2008.

STATEMENT CONCERNING FEDERALLY SPONSORED RESEARCH OR DEVELOPMENT

Not applicable.

TECHNICAL FIELD OF THE INVENTION

The invention relates to a method and a system for evaluating the productivity of a working machine and its driver. The invention also relates to a computer program relating to the method, and a computer software product.

BACKGROUND OF THE INVENTION

As working machines, for example forest machines are used, it is known that forest machines include various harvesters, forwarders and combinations of these, which are also called combi machines. In this description, such combi machines are also included when harvesters are referred to, if the function in question is similar to the function in a harvester. It is known that control systems are used for controlling the forest machines. One control system of prior art is Timbermatic 300, which is a system for controlling the functions of a forest machine and particularly a harvester head, and for measuring and bucking timber. In the forest machine, the control system controls, among other things, the diesel motor, the hydrostatic drive transmission, the harvester head, and the boom system, to which the harvester grapple is coupled, as well as all the auxiliary functions related to these. The control system in question operates, for example, in the PC/Windows 2000 operating environment. In the bucking instructions of the control system it is possible to include, for the timber to be processed, for example value, distribution and colour marking matrices, groups of types of timber, and trunk types. By means of an application included in the Timbermatic 300 system, it is possible to analyze and compute the production results, such as the number, length and diameter of logs, their levels of distribution, the groups of types of timber, and the trunk types. A corresponding control system in forwarders is Timbermatic 700, which controls, among other things, time management, positioning, and the loader weigher. A similar control system is also provided for baling presses for logging residues. The display and the central processing unit of the control system are placed in the cabin, within reach for the driver. Normally, the system also comprises a printer.

The control bus in the control and measuring automatics of the control system is based on a CAN bus solution of prior art, in which data is transferred in digital form. In the control bus, measurements and signals are transferred in a way known as such. On the basis of the data, it is possible to monitor measurements relating to the durations and functional speeds of different cycles in the processing. From the signals and measurements, information is obtained about the operating times and timings of components responsible for various functions. The components may be provided, for example, for the functions of the boom system or the harvester head connected to it, such as feeding, diameter measurement, length measurement, sawing, and delimbing. The processing of a single tree trunk involves a large number of measurement values that may be stored in a database which further comprises a classification, for example, on the basis of size classes of trunks and logs. The size class of the log is known on the basis of the measurement values.

Reduced technical performance of a forwarder, a harvester, or a harvester grapple, both in the overall system and its subsystems and constituent functions, will impair the profitability of the harvesting work. It has been difficult to detect a long-term reduction in the performance, because it has been based on, for example, the subjective evaluations and experiences of the operator or the maintenance personnel and servicemen, which may be limited in time and relate to some individual forest machines only. Furthermore, it has been impossible to evaluate effects caused by repair and change works or changes in ways of action in a reliable way.

Document WO 2006/128786 A1 discloses a method and a system for monitoring the function of a subsystem or the performance of one or more functions in a forest machine. It relates to the measurement of the condition or a performance characteristic value of one or more subsystems in a forest machine, and to presenting the result to the driver. Each measurement task involves the filtering of interference data case by case and the processing of data to a reliable characteristic value that can be utilized in the maintenance and optimization of the performance of the machine.

When the driver takes part in the control of the working machine, particularly a forest machine, and in the implementation of the work cycles, the evaluation of the technical performance of the working machine is not unambiguous. The operation of the system is dependent on both the technical performance of the subsystems of the working machine and the skills of the operator, that is, the driver of the forest machine, under varying conditions. The control commands entered by the driver and the driver's way of action will determine the operation of the whole system.

In view of the system for controlling the condition and productivity of the working machine, it is important to monitor and store the duration of each work cycle by taking several samples within a long period of time and then, on the basis of the monitoring, to indicate the changes taking place over a long period of time. Typically, the analysis of the operation and the condition of the working machine is based on statistical data collected over a long period of time.

It is thus necessary to monitor the work cycles of the working machine in real time by using the control commands entered by the driver which can be registered as control signals or messages via the user interface of the machine, as well as by using messages generated by the machine. The commands, messages and signals are transmitted in a control bus where communication can be monitored in real time.

However, the identification of the work cycles of the working machine by means of, for example, communication in the control bus, is a complex task. For identifying the work cycles, mathematical methods (HMM methods) are used, one of which is disclosed in the document "Work cycle recognition in human operated machine using Hidden Markov Models"; Palmroth L. Putkonen A.; The 8th International Conference on Motion and Vibration Control (MOVIC2006); KAIST, Daejeon, Korea; Aug. 27-30, 2006; p. 459-464.

The automatic and continuous identification of work cycles has several advantages relating to the monitoring of the condition and the productivity of the working machine. In the method, the duration of each work cycle and their distribution in time as part of a larger sequence of work cycles or a mode of the working machine, for example the unloading or loading of a forwarder, are monitored and compiled in statistics. By displaying the durations of the work cycles and their mutual distribution in time to the driver via the user interface of the working machine, the driver is given immediate feedback on the condition of the machine and on his own operation. The feedback is useful particularly when history data, such as trend data, are displayed for one or more work cycles, or the driver's performance is compared with, for example, a reference value or the performance of an experienced driver. For example, a reference value is obtained by monitoring other drivers and collecting history data on work cycles.

SUMMARY OF THE INVENTION

By means of a system of the invention it is possible to monitor the technical performance of working machines, such as forest machines, and to observe trends of long term, that is, variation in time. The monitoring is implemented by storing sufficient history data or by displaying the variation graphically or in the form of numerical data, or by retrieving the history data for an analysis. By means of the invention, it is possible to compare data relating to the execution of a function and performance data, measured in different operating conditions of the working machine, because the data to be determined can be made independent of variable factors, if desired. The information is utilized in the system for monitoring the condition of the working machine, and the illustrative, comprehensive and detailed nature of the data also provide an excellent basis for expert evaluations on what, for example, the performance of the forest machine as well as, for example, the productivity of the forest machine and its driver are, where possible problems might occur, and what should be done to improve the performance.

A particular advantage is that the implementation of the various embodiments of the invention does not require that the machine be supplemented with new sensors or computing modules, if this is not desired. By adding new sensors, it is also possible to monitor objects which are normally not included in the monitoring by the control system of the working machine but which may be relevant to the condition monitoring or the productivity.

An important feature of the graphical representation of the various embodiments of the invention is that it is illustrative to the driver. The data can be displayed graphically in a variety of ways.

For example, the driver of the forest machine controls the working machine by using two control sticks. Each driver has his own style of implementing the different work cycles, which is also referred to by different working methods. Each working method has its disadvantages and advantages, wherein a working method has the advantage of, for example, increased productivity, and the disadvantage of, for example, increased fuel consumption. Furthermore, the conditions of the operation affect the performing of the work cycles. However, it is possible to find a correlation between the variables measured during working, for example the control signals and commands, and the productivity under various conditions. In the case of the forest machine, condition factors include, for example, the species of the tree to be processed, the type of the work site, which is, for example, thinning or final felling. By means of the method and the system utilizing the correlation, it is possible to give the driver feedback and instructions to achieve better productivity. For example in forest machines, it is possible to use a cubic meter of wood produced in a given time ($m^3/h$) as a measure for productivity. Other characteristic values can also be used as a measure for productivity, particularly characteristic values relating to the time management, but also those based on the numbers or the weight of processed or manipulated trunks.

Changes in the productivity, caused by different working conditions, can be modelled by using variables which indicate the use conditions and the driver's action in varying tasks. The productivity can be modelled by mathematical methods and by utilizing fuzzy systems, especially by applying the ANFIS method (Adaptive Network-Based Fuzzy Interference System). The model is known as such, and its application is known, but its application particularly for evaluating the productivity of forest machines by using data obtained from the forest machine, is new. The model applies particularly the duration of time relating to the work cycles and their way of progress. The model is taught and validated by applying data obtained from several drivers in relation to the work cycles and tasks. The data is collected during a long period of time under normal conditions. By means of the method, estimated productivity is obtained. Mathematically, productivity is a function that is dependent on a number of variables which describe the driver's action to perform different tasks. Said function is also dependent on parameters describing the conditions of use. Said model can also be applied inversely to define mathematically the operation required for maximizing the productivity.

It is also possible to include in the model a baseline that indicates, for example, the skills and the productivity of an experienced driver when performing corresponding tasks. Consequently, comparisons can be made between the driver and other drivers of the machine. At the same time, by a more detailed analysis, it is possible to find out by mathematical methods, which work cycles or working methods would have the best possibilities for developing the driver's skills for improving productivity. Gradient calculations relating to the model can be used to find out, which parameters relating to the measurements involve the greatest potential for improving productivity. Gradient calculations refer to estimates on variables describing the driver's action, and their differential calculus. The use conditions are thus assumed to remain constant. On the basis of the calculations, the driver receives an instruction, in which factors of a task or in which work cycles of a task it is possible to achieve a fast improvement and increase in productivity. As a basis for the calculations, a model is used that describes productivity, taking into account the duration of time relating to the performing of the work cycles and also the driver's working method or the more accurate working technique that the driver selects to perform one or more work cycles. Finding out the working technique or working method is a requirement for being able to make comparisons, to determine the effect of a working method on productivity, and also to instruct the driver in using the working method.

In the following, we shall discuss particularly a forest machine and its driver. By means of the system, it is possible to optimize the interaction between the driver and the forest machine in such a way that by feedback provided by the system, the driver of the forest machine can improve his skills and learn to apply, in his work, efficient working methods of good quality and the most suitable working technique in different working conditions. The system may assist the driver in planning the felling work or the loading or forest transportation of timber and in selecting the most productive and efficient working method in the different work cycles on the basis of an optimal solution model. Merely the providing of feedback on the duration of the work cycles immediately at the work site gives the driver a chance to monitor his own work and to make comparisons. The solution model used by the system contains the most optimal model for the working technique in view of good productivity at each work site. The system may set driver-specific targets relating to the performing of the different work cycles of felling or loading of timber, and the target level in question is determined according to the individual skills of each driver.

By means of the system, it is also possible to optimize the technical performance of the machine by monitoring the performance of the different constituent functions of the machine and detecting level changes occurring therein, localizing possible fault situations, malfunctions or reasons for reduced performance. By means of the system, it is possible to make an analysis and give instructions or advice for correct methods in performing the work cycles or selecting the working method. This information can be given to the driver, for example, in the form of a comparison with statistical limits, for example for a work cycle or a sequence of work cycles.

In an advanced example of the system, the system calculates the setting or parameter values for a given function that are most optimal in a given situation of use of the machine, which values can also be automatically changed by the system. Alternatively, the driver may adjust the machine settings by using the optimal setting values suggested by the system.

By means of the system, significant advantages are achieved. The system can be used to determine a potential for improving the machine and the driver, taking into account the driver's skills, which are influenced by individual motor and cognitive skills, training and experience, and the capacity of the machine, including a capacity level specific for a given machine model, which is influenced by the technical condition of the different subsystems of the machine and the machine settings, as well as a gradual increase in the basic and starting level to react to changes in the functional state of the machine and the driver.

The system is also used for measuring the different factors of productivity and for evaluating the significance, taking into account the technical condition of the machine and the relating fault situations and machine parameter settings, as well as the driver's skills in driving and controlling the machine: the speed and smoothness of different control movements, wherein the driver-specific suitability of the machine settings and the driver's working technique on the work site level are taken into account in the evaluation.

The measurements on the different factors of the productivity of the machine always relate to a given functional point of the machine, wherein the system must also be capable of unambiguously determining and identifying the momentary functional point or state of the machine. This is assisted by the above-presented mathematical methods, particularly the HMM and ANFIS methods.

BRIEF DESCRIPTION OF THE DRAWINGS

In the following, the invention will be described in more detail with reference to the appended drawings, in which.

DETAILED DESCRIPTION OF THE INVENTION

Figure 1:
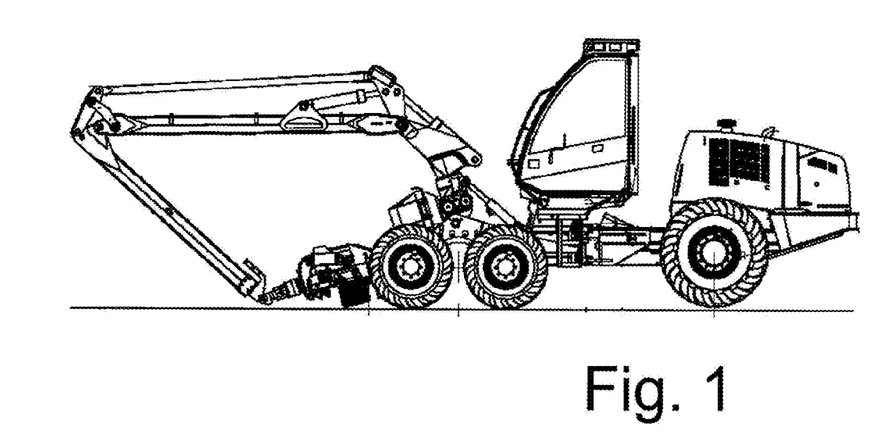
FIG. 1 shows a forest machine which is a harvester and in which the invention is applied.

FIG. 1 shows a forest machine of prior art, which is the John Deere 1070D harvester type known as such and in which the system according to the invention can be applied. The harvester is provided with frame steering, and it comprises a boom system whose end is provided with a harvester head for the processing of trunks. In this case, the control system of the harvester is Timbermatic 300, which is a PC based measuring and control system and in which the applications for measuring the performance according to the invention are built.

Figure 2:
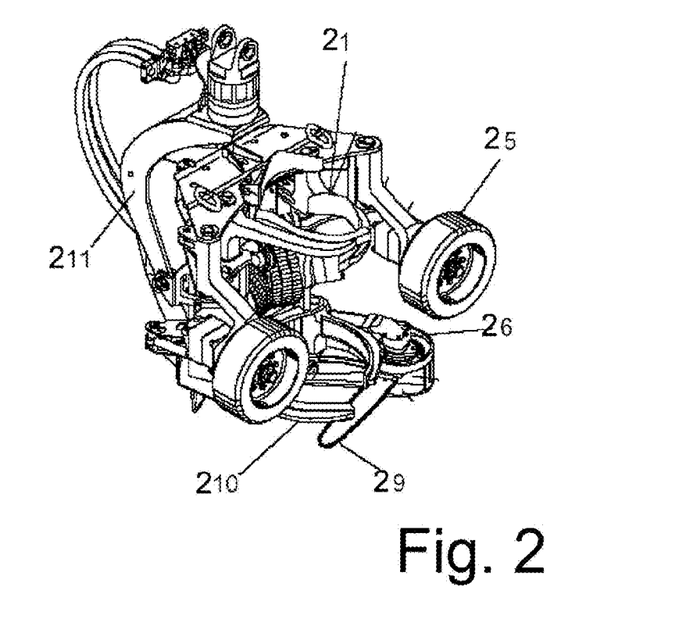
FIG. 2 shows a harvester head, the invention being applied for monitoring its performance.

FIG. 2 shows, in more detail, a harvester head of prior art, several embodiments of the invention relating to its monitoring. The harvester head comprises upper delimbing blades 21, lower delimbing blades 210, feed rolls 23, a saw motor 26, members for feeding 29 a guide bar and for controlling its position, and a tilt function 211, which are all known as such. The harvester head is used for measuring the diameter of the trunk, typically by means of the upper delimbing blades, and for measuring the length by means of a measuring roll.

Figure 3:
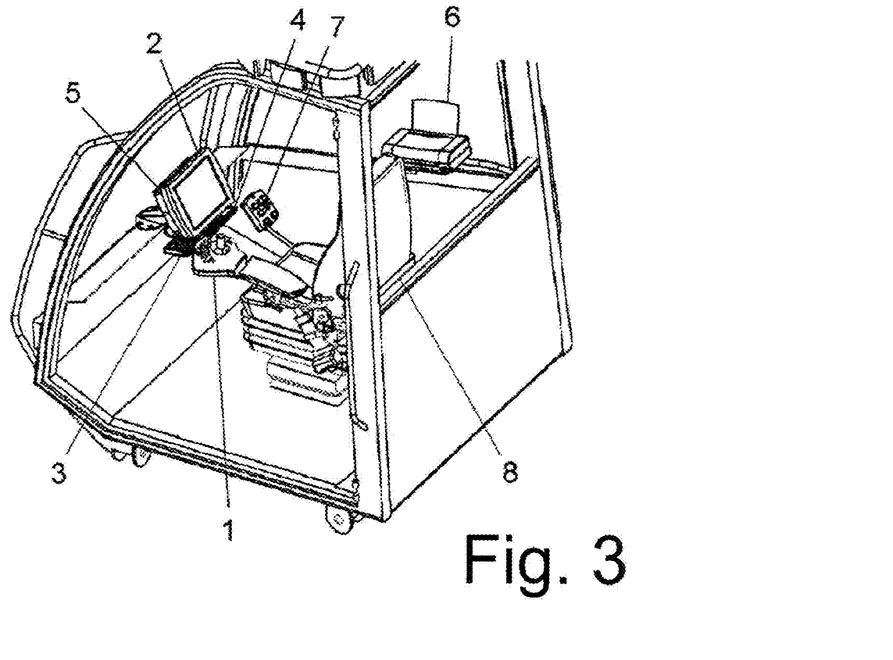
FIG. 3 shows the cabin of a harvester and the equipment of a control system placed therein.
Figure 4:
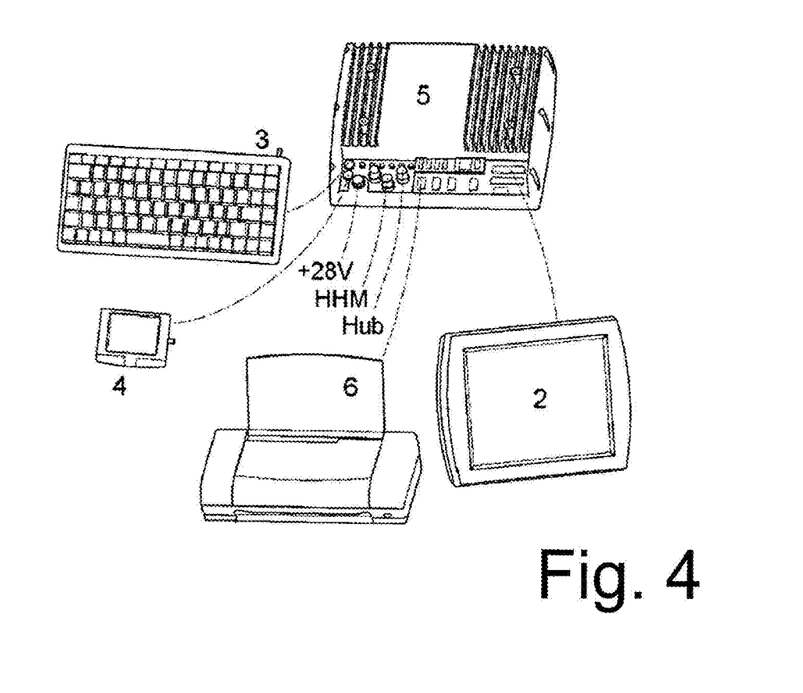
FIG. 4 shows the equipment of FIG. 3 in more detail.

In FIGS. 3 and 4, the same numbering is used for the same elements. FIG. 3 shows, in more detail, the cabin of the harvester so that the placement of the equipment of the control system is illustrated better. FIG. 4, in turn, shows the components of said equipment in more detail. The equipment of the control system comprises control panels 1, a display module 2, a PC keyboard 3, a touchpad mouse 4, a central processing unit (HPC-CPU) with a processor and a memory 5, a printer 6, a hub module 7, and a seat module 8 (Ch). The data and characteristic values provided by the system according to the invention are displayed to the driver graphically on the display module. The structure of the graphical representation may vary, covering, for example in the 2-dimensional coordinate system, a large variety of curves or line segments, or bar diagrams or other illustrative representations, even a numerical representation or listing in table form, which is particularly suitable for printouts.

For implementing the various embodiments of the invention, the required application and the software included therein is installed in the central processing unit of the control system comprising the necessary RAM and mass storage. The applications are either installed in a new forest machine or retrofitted in an older forest machine, in which case the medium for transferring the applications is, for example, a CD-ROM. The required CD disc drive is provided, for example, in the display module. The control system utilizes an operating system known as such, under which the application is run.

The execution environment may consist of various computers with their operating systems, particularly the processor-based control systems of forest machines, i.e. harvesters, which are intended for running applications and software to serve the control system, in which case it may be particularly a personal computer (PC) installed in the forest machine, or a workstation operating as such and comprising an operating system suitable for the purpose. The equipment and the operating system comprise the applications and protocol means necessary for data transmission with other devices. The operating system is preferably a turnkey system of prior art, which even provides services ready for the transmission of a data stream in e.g. a CAN bus. The measuring and control system of the forest machine comprises the necessary control computer to run the computer program including the method according to the invention.

The collected data can also be collected and utilized elsewhere, separately from the forest machine, wherein particularly computer systems relating to training are feasible, comprising the necessary analyzing software for the processing of data. Working machine simulators are also feasible, for monitoring the controls by the driver and performing the same operations of processing and displaying data as in a real working machine. By means of the simulator, it is possible to practice, for example, the use of a harvester and a forwarder and the harvesting virtually. Experienced drivers can also practice the driving of new machines and new harvesting methods. By means of the simulator, it is possible to take continual training, for example, to practice correct working methods and to increase productivity. In the John Deere simulator of prior art, the control devices are identical with those of a real harvester or forwarder, and the windscreen is replaced with a viewing screen. The simulator comprises a Timbermatic control system that gives reports on the practice. The progress of each trainee can be monitored, and the trainees can be compared with each other. A real-time feedback report with characteristic values is obtained from the work with the simulator, relating to the driver's time management, efficiency in using the loader, and the quantity of timber processed. The simulator provides a virtual operating environment for the real world, in which the invention can be applied.

In case of a forest machine or a simulator, the driver is immediately given information, via the user interface, on, for example, the work cycle times relating to the unloading or loading of a forwarder, either one by one or in total, wherein the driver receives immediate feedback on his action. The system may also give a comparative or reference value that indicates the statistical value of the driver in question, or a common value for several different drivers, or a value for an optimal performance determined on the basis of an experienced driver. By means of a separate computer system, it is possible to make a more detailed analysis together with experts and to give the driver feedback on his actions. Thus, a continual training process utilizing the system is feasible.

Figure 5:
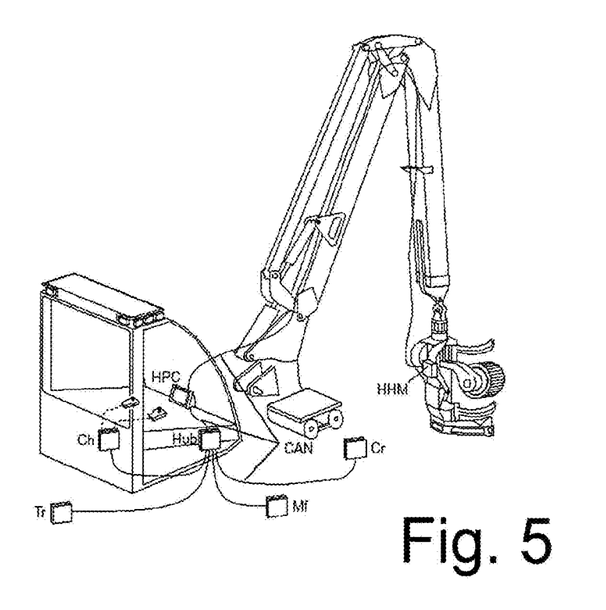
FIG. 5 is a principle view showing the structure of a digital control and measuring system according to one embodiment of the harvester, in which the invention is applied.

FIG. 5, in turn, is a more detailed view showing the structure of the digital control and measuring system of a forest machine and particularly a harvester, based on CAN (Controlled Area Network) bus technology and distributed control. The system consists of independent intelligent modules communicating via the CAN bus. The CAN bus technology enables a modular structure. The system is, for example, Timbermatic 300, which comprises a graphic user interface. The system controls the diesel motor, the hydrostatic drive transmission, the boom system, and the harvester head, as well as the auxiliary functions relating to these.

Figure 6:
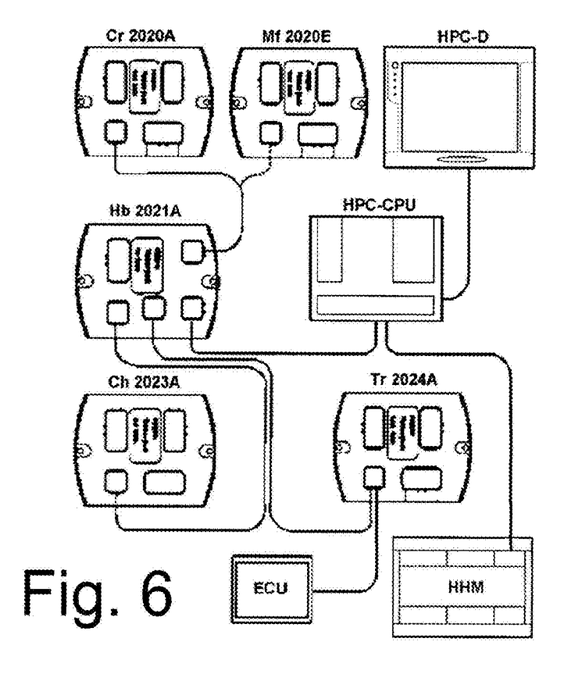
FIG. 6 shows the more detailed structure of the control and measuring system of FIG. 5.

The system typically consists of six or seven modules in the CAN bus, shown in more detail in FIG. 6. The modules of the system include a display module HPC-D, the central processing unit HPC-CPU (Harvester PC—Computer Processor Unit) of the computer, and a bus distribution module Hub (Hub module), to which the other modules are directly connected, except for the display and a harvester head module. The harvester head module HHM (Harvester Head Module) processes and transmits all the control signals to and the measurement data from the harvester head. The harvester head module HHM is coupled directly to the central processing unit HPC-CPU. All the control devices needed for controlling the system are coupled to a seat module Ch. A crane module Cr is responsible for controlling the valves of the boom system. A transmission module Tr is responsible for the control and the communication of the diesel motor, the drive transmission and the auxiliary functions relating to the basic machine. A multifunction module Mf is optional, and ECU is an engine control unit for controlling and monitoring the functions of the engine. In a forwarder, the system comprises fewer modules but has a corresponding structure, for example with respect to the boom system, when the invention is also applied in forwarders.

The basic data measured for the various embodiments of the invention are obtained from a digital communication bus connecting the control system modules of the forest machine, normally a CAN bus in forest machines. The measuring software selects the required signals from the bus communication during normal use, time stamps them, and buffers them for further processing.

The measurements and signals of the control bus of the control system of the forest machine can be collected and stored in a database, and the measurement data can be classified trunk by trunk and log by log, using different volume size classes of processed timber. The measurement values can be collected according to certain conditions measuring the operating conditions of the forest machine, and calculated values can be processed and derived from the measurement data before they are stored in a database. For example, the performance and efficiency measurements of the harvester grapple are based on measuring the duration and functional speeds of different steps in the processing. The processing of a single trunk involves a large number of measurement values, and many of the measurements are strongly dependent on each other. Particularly when the performance of the forest machine is measured, in relation to the technical capacity and the driver's skills in performing each work cycle and selecting the working methods, one should also take into account the correlation of the measurement values with the working conditions and the driver's method of driving.

Mathematical models configured in the system will find out the work cycles from the measurements. For example, in the case of a forwarder, the driver of the forwarder drives the loader in a different way in different situations. For example in the HMM method, the indirect measurements of models on a stochastic process are based on the use of the controls of the loader. The controls of the different joints of the loader are examined in a selected time window, and the indirect measurements on the work are calculated on information communicating on the CAN bus, wherein, among other things, the control speed of the loader, the direction of the control of the loader, the open or closed state of the loader, the data given by the load weigher, and the driving speed are taken into account. Observations are calculated at certain intervals, and from the observations, it is possible to calculate, for example by the HMM method, the different functional modes of the loader, which are represented by the different work cycles.

Figure 9:
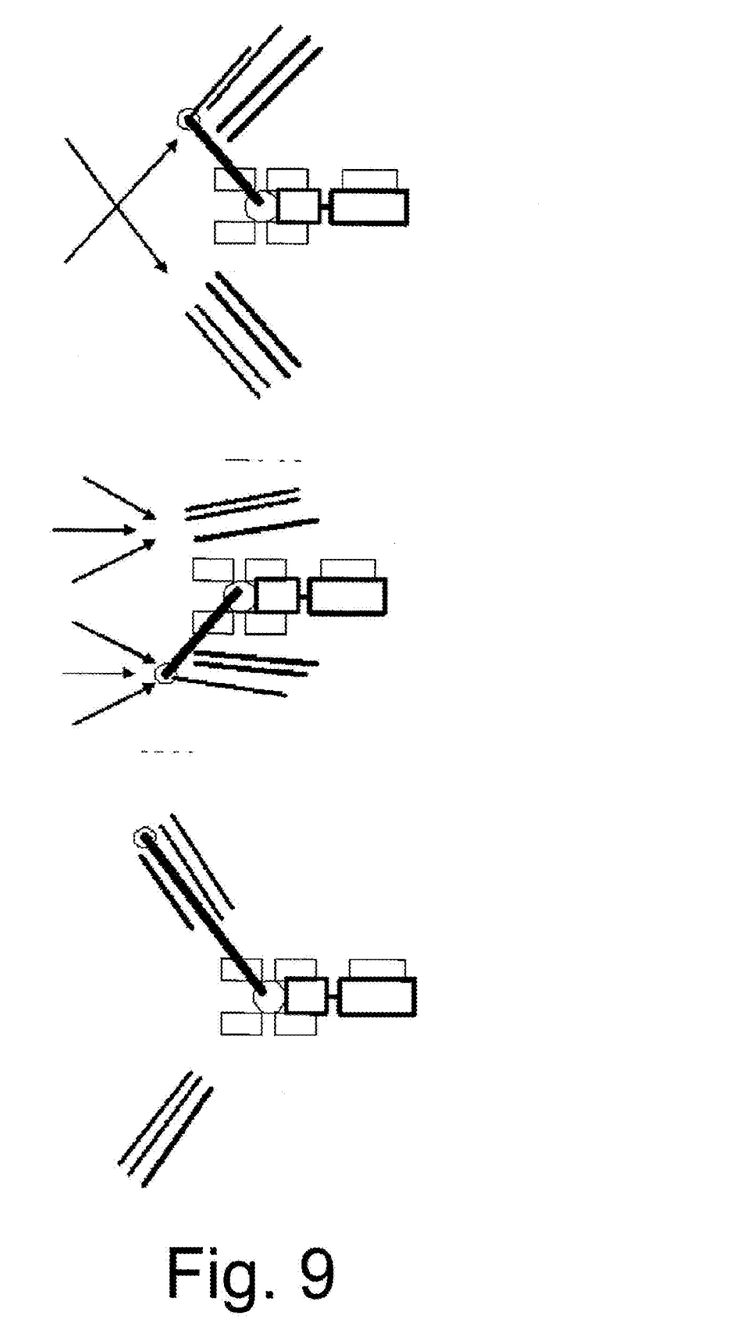
FIG. 9 illustrates different working methods of a harvester.

The system performs the work cycle specific measurements. In the case of the harvester, the picking up, felling and processing of a tree trunk are monitored. In the case of the forwarder, the loading and unloading are monitored. With respect to the actions of the driver, the work cycles and working methods applied by the driver are monitored, which can be done for each trunk or log by taking into account the measurement values provided by the system. The working methods with a harvester in the processing of a trunk are illustrated in FIG. 9. In the case of the harvester, the working methods refer, for example, to the fact that a tree trunk is processed and felled onto a stack, wherein the trunks are moved underneath the boom, wherein the felling direction of the trunk is obliquely to the side, and the trunk is not transferred across the logging road used by the machine; or the trunk is felled forward, wherein the trunk is not moved and a stack is formed to the side of the harvester; or the trunk is felled and moved across the logging road and stacked in a place at the side of the machine, and the stack extends obliquely to the machine.

Information on the work cycle and the state of each machine, particularly in the case of the loader, is found out by using the HMM method and the model produced by it. The model produces the state data by measuring and monitoring, for example, the control signals of the control sticks. Relating to the work cycles, work cycle times and state changes between work cycles are measured, for evaluating the skills of the driver: the control of the machine, the efficiency and smoothness of the work. From the collected multidimensional measurement data, a fuzzy evaluating method (ANFIS method) is used to derive comparable characteristic values measuring the driver's skills. In the different work cycles, the direction of the loader movements, the distance of transfer and the joint speeds effected by the driver are estimated from the measured control signals of the control stick, by means of which the working technique used by the driver is determined separately for the cycle of picking up a trunk, the cycle of felling and the cycle of processing, as already mentioned above. The working technique applied by the driver in the cycle of picking up a trunk, the cycle of felling and the cycle of processing is identified by means of a fuzzy deduction system (cf. ANFIS method). More precisely, the fuzzy method of evaluating the working technique is based on the measurement of the cycle of picking up a trunk or the direction of felling and the distance of transfer in the felling cycle, as well as the measurements of the direction of stacking and the distance of stacking in the processing cycle.

By means of the system, work cycle specific measurement information on the working method or working technique is stored in the database of the system in real time and in a context specific manner both for each work site and for each trunk in a given period of time, and even for the whole history of operating the machine. This kind of monitoring and storage of data makes it possible to monitor the development of the driver's skills, to give real-time feedback on the different factors of productivity, and to instruct the driver at the work site.

In evaluating the potential for developing the driver's skills, statistically defined reference values are used for the productivity and the duration of time of the different work cycles. A deviation in the performance and/or productivity from an expected value representing a reference value can be broken down to reasons due to different factors relating to either the technical condition of the machine or the driver's working technique. On the basis of the most significant deviations in the performance with respect to productivity, the system gives the driver a proposal for an operation or improvement. The system contains or produces a solution model of the most suitable working technique in a given work cycle and under given working conditions. The feedback from the system relates to a given working method or a feature in the skills of the driver.

More precisely relating to the measurements, in that embodiment of the invention which involves a boom system, the basic measurements used are, for a harvester, the control signals and operating times of the joints of the loader for each log, as well as the diameter profiles and lengths of the logs. If the forest machine is equipped with the pressure measurement of the hydraulic system of the boom system, the pressure measurements can also be entered. In forwarder use, the operating times of the joints of the boom system are measured for each work cycle during the loading or unloading of a tree trunk. Furthermore, the weight of a load to be lifted, obtained from a load weigher, and the pressure of the hydraulic system, if needed, are entered, if the forest machine is equipped with the respective sensors. The load weigher is coupled between the boom system and the harvester head or, in a forwarder, between the boom system and the loader grapple.

Figure 7:
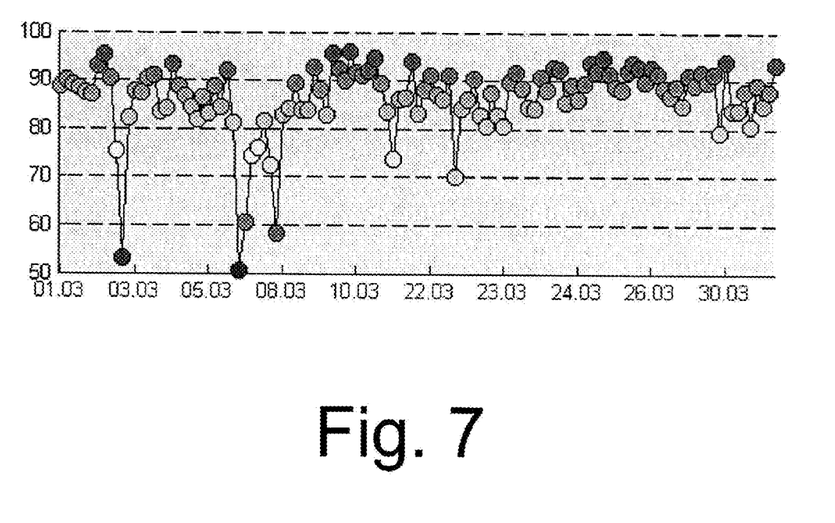
FIG. 7 illustrates the displaying of history data on productivity.
Figure 8:
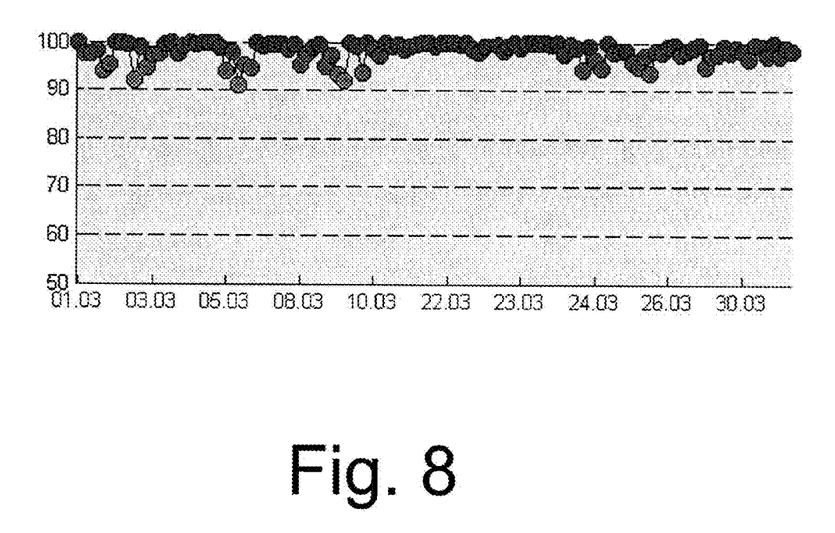
FIG. 8 illustrates the displaying of history data on fuel consumption.

The values relating to the productivity and the fuel consumption can be presented as trends and history data to the driver, wherein the action of the driver in question and the performance of the machine can be evaluated. As examples, FIGS. 7 and 8 show an index value relating to the total productivity and the fuel consumption. In the mathematical processing of information and data, it is possible to apply the methods presented in WO 2006/128786 A1 which relate particularly to the evaluation of the technical performance of the working machine. A general index indicates the level of general operation, but, for example, a total index contains several indices of subsystems. By monitoring history data, it is possible to determine, in more detail, the effects of a function of the machine or the action of the driver on the total productivity. If the history data indicate major changes, particularly a decline of the level, this may imply, for example, a problem relating to the technical performance of the machine, if the driver's actions have remained the same in other respects and no significant changes have occurred in the conditions in the different work sites. For each machine, it is also possible to monitor the development of each driver in raising the productivity, wherein the total index also increases and shifts, for example, towards the reference level that is aimed at. Thanks to the versatile and extensive data, it is possible to monitor the performance of a single work cycle or a series of work cycles, and to detect the items to be improved and the items with the greatest progress, also in view of working methods.

The invention can be applied in a variety of ways for monitoring different functions of the forest machine used as the working machine, wherein information is obtained from a sufficiently long time to support decisions. The presented system and method is not only suitable for a harvester but it can also be used in forwarders. In forwarders, it is also possible to monitor, for example, the condition and function of the boom system, as well as the fuel economy. The data can be displayed to the driver in an illustrative way and used to support decisions.

The basis taken for the measurements on the productivity of the harvester and for the evaluation of the driver's work is, first of all, the picking up and felling of a trunk and, on the other hand, the processing of the trunk.

In the picking up and felling of a trunk, the following work cycles are determined:
clearing time,
picking up of a trunk by means of a loader and/or driving,
the distance and time relating to the felling and transfer of the trunk,
the movement of direction, the transfer distance and joint speeds of the loader in different cycles of felling and transfer,
the simultaneous use of loader joints in work cycles, and
idle time.

On the basis of the measurements taken, time management in the different work cycles is determined and used for the evaluation of the productivity; also, the time sequence measurement of the work cycles is determined and the state changes are determined and used for evaluating the smoothness of the work and, if necessary, also for assisting in the planning of the work and in the decision-making. On the basis of the measurements, it is also possible to identify the working technique used, as already presented above.

In the processing of the trunk, the following work cycles are determined:
- the time of transfer during stacking and the distance of transferring the trunk in the different processing cycles,
- the direction of movement, the transfer distance and the joint speeds of the loader in the different stacking cycles, for each trunk or log,
- the delimbing movement in connection with the feeding,
- changes in the length measurement,
- time and distance of changing the length,
- duration of making a decision of cutting,
- time and distance of driving the machine forward and/or backward,
- the simultaneous use of loader joints in work cycles, and
- idle time.

On the basis of the measurements taken, the time sequence measurement of the work cycles is taken and the state changes are determined and used for evaluating the smoothness of the work and, if necessary, also for assisting in the planning of the work and in the decision-making. On the basis of the measurements, it is also possible to identify the number of processed trunks or logs at each work site.

The basis taken for the measurements of the productivity of a forwarder and for evaluating the driver's work is, first of all, loading, and, on the other hand, unloading.

In loading, the following work cycles are determined:
- the transfer of the empty loader at a stack,
- the transfer of logs on the ground,
- the picking up of a load,
- the transfer of the load into the load space,
- the placement of the load,
- the arrangement of logs in the load space,
- a pause, and
- other work.

On the basis of the measurements taken, the average loading cycle time, work cycle times, the number of repetitions of different work cycles, and the fuel consumption according to the work cycles are determined, to make conclusions on the condition of the loader, or the data can be transferred to a condition monitoring system of the loader to draw conclusions on the condition. All or some of the above-presented data are presented to the driver via the display of the user interface, so that the driver can evaluate his own actions immediately, in real time.

In unloading, the following work cycles are determined:
- the picking up of a load from the load space,
- the transfer of the load to a stack,
- the placement of the load,
- the arrangement of the stack,
- the bringing of the grapple into the load space,
- a pause, and
- other work.

On the basis of the measurements taken, the average loading cycle time, work cycle times, the number of repetitions of different work cycles, and the fuel consumption for each work cycle are determined, to make conclusions on the condition of the loader, and the data can be transferred to the condition monitoring system of the loader to draw conclusions on the condition. All or some of the above-presented data are presented to the driver via the display of the user interface, so that the driver can evaluate his own actions.

On the basis of the measurements taken, it is also possible to determine, for example, the technical capacity of the forwarder. In particular, the examination relates to efficiency in the different work cycles and work cycle specific fuel consumption. The fuel consumption at each moment of time is available in the form of measurement data from the control system of the motor, and it is also monitored in the control system of the working machine.

The work cycle specific fuel consumption of the forwarder is monitored particularly as follows:
- total consumption,
- during loading with the loader,
- during unloading with the loader,
- during loading when driving and operating the loader,
- during driving when empty,
- during loading and driving,
- during driving with a load, and
- during running idle.

On the basis of the monitoring, it is possible to calculate, for example, a fuel economy index for the operation of the loader and a fuel economy index for the drive transmission by means of the principles discussed above. The results can be presented as history data in a suitable way.

In conclusion, the operation of the system will be described briefly as follows.

The measurements are taken in the system, including work cycle measurements, characteristic values relating to the different work cycles, and measurements on the performance of different constituent functions of the machine.

The measurements are processed in the system, wherein a characteristic value for the performance is determined to describe the machine and the driver and to determine the working method or working technique relating to the work.

In the next step, productivity is evaluated, wherein the effect of different factors is evaluated by means of reference values, including the technical condition of the machine and the machine settings relating to the performance, the driver's working technique, the driver's skills and ability to control the machine, particularly in relation to the use of the loader and the processing of wood, wherein the settings of the machine parameters are taken into account and their effect is compensated for.

The system comprises information about an optimal solution model, including, for example, an optimal model for a working method, taking the conditions into account.

The results of evaluating the productivity can be compared with an optimized solution model, on the basis of which proposals for action are obtained on the level of work points and history data are monitored.

In the case of a forwarder, illustrated structured data on the work can be displayed to its driver by means of the user interface. On the display, the work is divided, for example, into loading and unloading, displaying the percentage or duration of time for each of said work cycles. It is also possible to display the percentages of loading and unloading in a comparison. The results may include the data on one or more work operations, and furthermore, it is possible to display trend data on different work cycles.

The invention is not limited solely to the examples presented above, but it may vary according to the appended claims. By means of the invention, it is possible to form a computer-based system for online and offline use, divided, for example, into a working machine application and an office application, or a combination of these, in which these cooperate. The system can be utilized for evaluating the efficiency of the work by the driver of the working machine and for evaluating his working technique, or for measuring the efficiency of the work by the driver of the working machine and for evaluating the working technique in view of the productivity and fuel consumption of the working machine, or as a method for evaluating the skills of the driver of the working machine, or as an interactive instructing system between the driver of the working machine and the working machine, or as a system for measurement and control of the productivity of the working machine, or for optimizing the productivity of the working machine, or as a controlling and instructing system for optimizing the performance of the working machine. In general, it is used for optimizing the interaction between the working machine and the driver.

I claim:

1. A method for evaluating the productivity of a working machine and its driver in a real or virtual operating environment, said working machine being controlled by means of a control system to perform work, comprising the steps of:

performing, in the control system, for collecting measurement data, continuous measurements directed to the working machine when the working machine is controlled by the driver to perform work;

determining, in the control system or a separate computer system, work cycles relating to said work by identifying said work cycles by mathematical methods and based on said measurement data obtained from the working machine;

determining, in the control system or the separate computer system, work cycle times and state changes between work cycles relating to said work, the determination being based on said measurement data;

deriving, in the control system or the separate computer system, characteristic values representing said work and productivity of the driver by a model applying a fuzzy evaluating method, the derivation being based on said measurement data, said work cycle times and said state changes; and collecting, in the control system or the separate computer system, said characteristic values for the purpose of evaluating the performance of the work or for comparison.

2. The method according to claim 1, further comprising the step of presenting, as a characteristic value, one or more time values of one or more work cycles in the form of an illustrative graphic presentation to the driver.

3. The method according to claim 2, wherein the working machine comprises a display module connected to the control system, and the method comprises the step of the displaying of said representation by means of said display module.

4. The method according to claim 1, wherein the working machine comprises a control bus connected to the control system, and said measurements relates to signals transmitted in said control bus.

5. The method according to claim 1, wherein the working machine is a forestry machine selected from the group: consisting of a harvester and a forwarder.

6. The method according to claim 1, wherein the virtual operating environment is a working machine simulator, whose operation corresponds to the driving of the working machine in a real operating environment.

7. The method according to claim 1, wherein the working machine is a harvester and the method further comprises the step of modeling the working method of the driver for performing said work cycles by mathematical methods and based on measurements obtained from said harvester, the measurements being related to both the direction of felling of a trunk in a picking up cycle and the distance of transfer of the trunk in the picking up cycle, or both the direction of felling of a trunk in a felling cycle and the distance of transfer of the trunk in the felling cycle, or both the direction of stacking of a trunk in a processing cycle and the distance of stacking of the trunk in the processing cycle.

8. The method according to claim 1, further comprising the step of comparing the performing of the work cycles with a reference, given limits, or the actions of an experienced driver, and giving feedback from the comparisons to the driver of the working machine.

9. The method according to claim 1, further comprising the step of continuously monitoring the performing of the work cycles, classified according to the size class of a tree trunk to be processed.

10. The method according to claim 1, further comprising the step of monitoring the fuel consumption of the working machine by continuously monitoring at least the quantity of fuel consumed by the machine for processing a tree trunk in different work cycles.

11. The method according to claim 1, further comprising the step of monitoring the operation of a boom system of the working machine.

12. The method according to claim 1, further comprising the step of analyzing the work cycles by mathematical methods and determining, for performing the work, those work cycles, in which a quick improvement in the productivity can be achieved, and performing said analysis individually for the driver of the working machine.

13. A non-transitory computer readable medium comprising computer instructions that are stored therein and configured to cause a control computer to execute the steps of the method according to claim 1 when said computer instructions are run the control computer.

14. The non-transitory computer readable medium according to claim 13, wherein said control computer is a central processing unit of a control system of a forest machine.

15. A non-transitory computer readable medium containing computer instructions stored therein for causing a computer processor to perform the steps of the method according to claim 1.

16. The non transitory computer readable medium according to claim 15, wherein said computer processor is a central processing unit of a control system of a forest machine.

17. The method according to claim 1, wherein said model applies the fuzzy evaluating method of an adaptive network-based fuzzy interference system.

18. A system for evaluating the productivity of a working machine and its driver in a real or virtual operating environment, comprising a control system arranged to control said working machine and its different functions to perform work, wherein the control system is configured to perform, for collecting measurement data, continuous measurements directed to the working machine when the working machine is controlled by the driver to perform work;

to determine work cycles relating to said work by identifying said work cycles by mathematical methods and based on said measurement data obtained from the working machine;

to determine work cycle times and state changes between work cycles relating to said work, the determination being based on said measurement data;

to derive characteristic values representing said work and productivity of the driver by a model applying a fuzzy evaluating method, the derivation being based on said measurement data, said work cycle times and said state changes; and to collect said characteristic values for the purpose of evaluating the performance of the work or for comparison.

19. The system according to claim 18, wherein the system also comprises a control bus connected to the control system and configured to operate under the control of the control system, said measurements being directed to a signal transmitted in said control bus.

20. The system according to claim 18, wherein the control system is configured to present, as a characteristic value, a common or detailed variation or duration in time of one or more work cycles in the form of an illustrative graphic presentation to the driver.

* * * * *